US012750565B2

(12) United States Patent
Babaeizadeh et al.

(10) Patent No.: US 12,750,565 B2
(45) Date of Patent: Sep. 29, 2026

(54) VARIABLE LENGTH VIDEO GENERATION FROM TEXTUAL DESCRIPTIONS

(71) Applicant: Google LLC, Mountain View, CA (US)

(72) Inventors: Mohammad Babaeizadeh, San Jose, CA (US); Ruben Eduardo Villegas, Chelsea, MI (US); Han Zhang, Sunnyvale, CA (US); Pieter-Jan Kindermans, Zurich (CH); Horacio Hernan Moraldo, Mountain View, CA (US); Mohammad Taghi Saffar, Santa Clara, CA (US); Dumitru Erhan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/116,410

(22) PCT Filed: Sep. 28, 2023

(86) PCT No.: PCT/US2023/034037

§ 371 (c)(1),
(2) Date: Mar. 28, 2025

(87) PCT Pub. No.: WO2024/072999

PCT Pub. Date: Apr. 4, 2024

(65) Prior Publication Data

US 2026/0136077 A1 May 14, 2026

Related U.S. Application Data

(60) Provisional application No. 63/411,092, filed on Sep. 28, 2022.

(51) Int. Cl.
*H04N 21/81* (2011.01)
*G06N 3/0455* (2023.01)
*G06N 3/08* (2023.01)

(52) U.S. Cl.
CPC ......... *H04N 21/816* (2013.01); *G06N 3/0455* (2023.01); *G06N 3/08* (2013.01)

(58) Field of Classification Search
CPC ....... H04N 21/816; G06N 3/0455; G06N 3/08
See application file for complete search history.

(56) References Cited

U.S. PATENT DOCUMENTS

| | | | | |
|---|---|---|---|---|
| 11,594,255 | B2 * | 2/2023 | Fahy | G11B 27/031 |
| 2009/0112604 | A1 * | 4/2009 | Scholz | G09B 7/02 704/E15.001 |
| 2023/0262293 | A1 * | 8/2023 | Barbieri | H04N 21/47205 715/716 |

OTHER PUBLICATIONS

Aldausari et al., "Video Generative Adversarial Networks: A Review," Acm Computing Surveys, Acm, Jan. 18, 2022, 55(2), pp. 1-25.

(Continued)

*Primary Examiner* — Oschta I Montoya
(74) *Attorney, Agent, or Firm* — Fish & Richardson P.C.

(57) ABSTRACT

Methods, systems, and apparatus, including computer programs encoded on a computer storage medium, for generating a video. In one aspect, a method comprises receiving a first text prompt, using a video generation neural network to generate an initial segment of the video conditioned on the first text prompt, and updating the video for each of one or more update iterations by obtaining an additional text prompt for each update iteration and by using the video generation neural network to generate an additional segment of the video conditioned on the text prompt for the update iteration.

20 Claims, 9 Drawing Sheets

VARIABLE LENGTH VIDEO GENERATION 100

(56) References Cited

OTHER PUBLICATIONS

Arnab et al., "ViViT: A Video Vision Transformer," Proceedings of the IEEE/CVF International Conference on Computer Vision (ICCV), 2021, pp. 6836-6846.
Babaeizadeh et al., "FitVid: Overfitting in Pixel-Level Video Prediction," CoRR, Submitted Jun. 24, 2021, arXiv:2106.13195v1, 25 Pages.
Babaeizadeh et al., "Stochastic Variational Video Prediction," CoRR, Submitted Mar. 6, 2018, arXiv:1710.11252v2, 15 pages.
Bain et al., "Frozen in Time: A Joint Video and Image Encoder for End-to-End Retrieval," Proceedings of the IEEE/CVF International Conference on Computer Vision (ICCV), 2021, pp. 1728-1738.
Balaji et al., "Conditional GAN with Discriminative Filter Generation for Text-to-Video Synthesis," Proceedings of the Twenty-Eighth International Joint Conference on Artificial Intelligence (IJCAI-19), 2019, pp. 1995-2001.
Carreira et al., "A Short Note about Kinetics-600," CoRR, Submitted Aug. 3, 2018, arXiv:1808.01340v1, 6 Pages.
Carreira et al., "Quo Vadis, Action Recognition? A New Model and the Kinetics Dataset," Proceedings of the IEEE Conference on Computer Vision and Pattern Recognition (CVPR), 2017, pp. 6299-6308.
Chang et al., "MaskGIT: Masked Generative Image Transformer," Proceedings of the IEEE/CVF Conference on Computer Vision and Pattern Recognition (CVPR), 2022, pp. 11315-11325.
Clark et al., "Adversarial Video Generation on Complex Datasets," CoRR, Submitted Sep. 25, 2019, arXiv:1907.06571v2, 21 pages.
Denton et al., "Stochastic Video Generation with a Learned Prior," Proceedings of the 35th International Conference on Machine Learning, PMLR, 2018, 80:1174-1183.
Ebert et al., "Self-Supervised Visual Planning with Temporal Skip Connections," Conference on Robot Learning, 2017, 13 pages.
Esser et al., "Taming Transformers for High-Resolution Image Synthesis," Proceedings of the IEEE/CVF Conference on Computer Vision and Pattern Recognition (CVPR), 2021, pp. 12873-12883.
Finn et al., "Unsupervised Learning for Physical Interaction through Video Prediction," Advances in Neural Information Processing Systems 29, 2016, 9 pages.
Harvey et al., "Flexible Diffusion Modeling of Long Videos," Advances in Neural Information Processing Systems 35, 2022, 13 Pages.
Heusel et al., "GANs Trained by a Two Time-Scale Update Rule Converge to a Local Nash Equilibrium," Advances in Neural Information Processing Systems 30, 2017, 12 Pages.
Ho et al., "Classifier-Free Diffusion Guidance," CoRR, Submitted Jul. 26, 2022, arXiv:2207.12598v1, 14 pages.
Ho et al., "Video Diffusion Models," Advances in Neural Information Processing Systems 35, 2022, 14 pages.
Hong et al., "CogVideo: Large-scale Pretraining for Text-to-Video Generation via Transformers," CoRR, Submitted May 29, 2022, arXiv:2205.15868v1, 15 pages.
Hoppe et al., "Diffusion Models for Video Prediction and Infilling," CoRR, Submitted Nov. 14, 2022, arXiv:2206.07696v3, 22 pages.
International Preliminary Report on Patentability in International Appln. No. PCT/US2023/034037, mailed on Apr. 10, 2025, 13 Pages.
International Search Report and Written Opinion in International Appln. No. PCT/US2023/034037, mailed on Dec. 14, 2023, 18 Pages.
Johnson et al., "Perceptual Losses for Real-Time Style Transfer and Super-Resolution," Computer Vision—ECCV 2016, Sep. 17, 2016, 17 pages.
Karras et al., "Analyzing and Improving the Image Quality of StyleGAN," Proceedings of the IEEE/CVF Conference on Computer Vision and Pattern Recognition (CVPR), 2020, pp. 8110-8119, 10 pages.
Kay et al., "The Kinetics Human Action Video Dataset," CoRR, Submitted May 19, 2017, arXiv:1705.06950v1, 22 pages.
Kingma et al., "Adam: A Method for Stochastic Optimization," CoRR, Submitted Jan. 30, 2017, arXiv:1412.6980v9, 15 pages.
Kumar et al., "VideoFlow: A Conditional Flow-Based Model for Stochastic Video Generation," CoRR, Submitted Feb. 12, 2020, arXiv:1903.01434v3, 18 pages.
Li et al., "Video Generation From Text," CoRR, Submitted Oct. 1, 2017, arXiv:1710.00421V1, 20 pages.
Li et al., "Video Generation From Text," Proceedings of the AAAI Conference on Artificial Intelligence, Apr. 27, 2018, 32(1):7065-7072.
Loshchilov et al., "Decoupled Weight Decay Regularization," CoRR, Submitted Jan. 4, 2019, arXiv:1711.05101v3, 19 pages.
Luc et al., "Transformation-based Adversarial Video Prediction on Large-Scale Data," CoRR, Submitted Nov. 17, 2021, arXiv:2003.04035v3, 22 pages.
Moing et al., "CCVS: Context-aware Controllable Video Synthesis," Advances in Neural Information Processing Systems 34, 2021, 14 pages.
Monfort et al., "Moments in Time Dataset: One Million Videos for Event Understanding," IEEE Transactions on Pattern Analysis and Machine Intelligence, Feb. 2020, 42(2):502-508.
Nagrani et al., "Learning Audio-Video Modalities from Image Captions," CoRR, Submitted Apr. 1, 2022, arXiv:2204.00679v1, 18 Pages.
Nash et al., "Transframer: Arbitrary Frame Prediction with Generative Models," CoRR, Submitted May 9, 2022, arXiv:2203.09494v3, 34 Pages.
Nichol et al., "Glide: Towards Photorealistic Image Generation and Editing with Text-Guided Diffusion Models," CoRR, Submitted Mar. 8, 2022, arXiv:2112.10741v3, 20 pages.
Rakhimov et al., "Latent Video Transformer," CoRR, Submitted Jun. 18, 2020, arXiv:2006.10704v1, 18 pages.
Ramesh et al., "Hierarchical Text-Conditional Image Generation with CLIP Latents," CoRR, Submitted Apr. 13, 2022, arXiv:2204.06125v1, 27 pages.
Ramesh et al., "Zero-Shot Text-to-Image Generation," Proceedings of the 38th International Conference on Machine Learning, PMLR, 2021, 139:8821-8831.
Ranzato et al., "Video (language) modeling: a baseline for generative models of natural videos," CoRR, Submitted May 4, 2016, arXiv:1412.6604v5, 15 pages.
Roberts et al., "Scaling Up Models and Data with t5x and seqio," Journal of Machine Learning Research, Nov. 2023, 24:1-8.
Saharia et al., "Photorealistic Text-to-Image Diffusion Models with Deep Language Understanding," Advances in Neural Information Processing Systems 35, 2022, 16 pages.
Saito et al., "Temporal Generative Adversarial Nets With Singular Value Clipping," Proceedings of the IEEE International Conference on Computer Vision (ICCV), 2017, pp. 2830-2839.
Saito et al., "Train Sparsely, Generate Densely: Memory-Efficient Unsupervised Training of High-Resolution Temporal GAN," CoRR, Submitted Jun. 1, 2020, arXiv:1811.09245v2, 22 pages.
Schuhmann et al., "LAION-400M: Open Dataset of CLIP-Filtered 400 Million Image-Text Pairs," CoRR, Submitted Nov. 3, 2021, arXiv:2111.02114v1, 5 pages.
Seo et al., "Harp: Autoregressive latent video prediction with high-fidelity image generator," CoRR, Submitted Sep. 15, 2022, arXiv:2209.07143v1, 11 pages.
Srivastava et al., "Unsupervised Learning of Video Representations using LSTMs," Proceedings of the 32nd International Conference on Machine Learning, PMLR, 2015, 37:843-852.
Tulyakov et al., "MoCoGAN: Decomposing Motion and Content for Video Generation," Proceedings of the IEEE Conference on Computer Vision and Pattern Recognition (CVPR), 2018, pp. 1526-1535.
Unterthiner et al., "Towards Accurate Generative Models of Video: A New Metric & Challenges," CoRR, Submitted Mar. 27, 2019, arXiv:1812.01717v2, 17 pages.
Van den Oord et al., "Neural Discrete Representation Learning," Advances in Neural Information Processing Systems 30 (NIPS), 2017, 10 pages.

(56) References Cited

OTHER PUBLICATIONS

Villegas et al., "High Fidelity Video Prediction with Large Stochastic Recurrent Neural Networks," Advances in Neural Information Processing Systems 32 (NeurIPS), 2019, 11 pages.
Villegas et al., "Phenaki: Variable Length Video Generation From Open Domain Textual Description," CoRR, Submitted on Oct. 5, 2022, arXiv:2210.02399v1, 17 pages.
Voleti et al., "MCVD—Masked Conditional Video Diffusion for Prediction, Generation, and Interpolation," Advances in Neural Information Processing Systems 35 (NeurIPS), 2022, 15 pages.
Vondrick et al., "Generating Videos with Scene Dynamics," Advances in Neural Information Processing Systems 29 (NIPS), 2016, 9 pages.
Walker et al., "Predicting Video with VQVAE," CoRR, Submitted Mar. 2, 2021, arXiv:2103.01950v1, 13 pages.
Wang et al., "PredRNN: Recurrent Neural Networks for Predictive Learning using Spatiotemporal LSTMs," Advances in Neural Information Processing Systems 30 (NIPS) 2017, 10 pages.
Weissenborn et al., "Scaling Autoregressive Video Models," CoRR, Submitted Feb. 10, 2020, arXiv:1906.02634v3, 24 pages.
Wu et al., "Godiva: Generating Open-Domain Videos From Natural Descriptions", CoRR, Submitted Apr. 30, 2021, arXiv:2104.14806v1, 12 pages.
Wu et al., "NUWA: Visual Synthesis Pre-training for Neural visUal World creAtion," CoRR, Submitted Nov. 24, 2021, arXiv:2111.12417v1, 28 Pages.
Wu et al., "NUWA—Infinity: Autoregressive over Autoregressive Generation for Infinite Visual Synthesis," CoRR, Submitted Aug. 12, 2022, arXiv:2207.09814v2, 23 pages.
Xu et al., "Vlm: Task-Agnostic Video-Language Model Pre-Training For Video Understanding," CoRR, Submitted May 20, 2021, arXiv:2105.099996v1, 13 pages.
Yan et al., "VideoGPT: Video Generation using VQ-VAE and Transformers," CoRR, Submitted Sep. 14, 2021, arXiv:2104.10157v2, 14 pages.
Yang et al., "Diffusion Probabilistic Modeling for Video Generation," Entropy 25, Oct. 20, 2023, 10:1469, 22 pages.
Yu et al., "Scaling Autoregressive Models for Content-Rich Text-to-Image Generation," CoRR, Submitted Jun. 22, 2022, arXiv:2206.10789v1, 49 pages.
Yu et al., "Vector-quantized Image Modeling with Improved VQGAN," CoRR, Submitted Jun. 5, 2022, arXiv:2110.04627v3, 17 pages.
Zhai et al., "Scaling Vision Transformers," Proceedings of the IEEE/CVF Conference on Computer Vision and Pattern Recognition (CVPR), 2022, pp. 12104-12113.
Zhang et al., "The Unreasonable Effectiveness of Deep Features as a Perceptual Metric," Proceedings of the IEEE Conference on Computer Vision and Pattern Recognition (CVPR), 2018, pp. 586-595.
Ho et al., "Video Diffusion Models," CoRR, Submitted on Apr. 7, 2022, arXiv:2204.03458v1, 11 pages.
Office Action in Indian Appln. No. 202517021881, May 29, 2026, 7 pages.

* cited by examiner

VARIABLE LENGTH VIDEO GENERATION 100

VARIABLE LENGTH VIDEO GENERATION FROM TEXTUAL DESCRIPTIONS

CROSS-REFERENCE TO RELATED APPLICATION

This application is a National Stage Application under 35 U.S.C. § 371 and claims the benefit of International Application No. PCT/US2023/034037, filed Sep. 28, 2023, which claims priority to U.S. Application No. 63/411,092, filed Sep. 28, 2022, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that generates a video conditioned on one or more text inputs. The video includes a respective video frame at each of multiple time steps.

In particular, the system receives a first text prompt, e.g., from a user of the system. The user can submit the text prompt in any of a variety of ways. e.g., by entering text using an input device or by submitting an audio input that is transcribed by the system.

The system generates, using a video generation neural network and conditioned on the first text prompt, an initial segment of the video that includes a respective video frame at each of a plurality of initial time steps in the video.

The system then updates the video at each of one or more update iterations by generating an additional video segment for the update iteration that includes a respective video frame at each of a plurality of time steps immediately following the last video frame in the video as of the update iteration.

To update the video at a given update iteration, the system obtains an additional text prompt for the update iteration and generates, using the video generation neural network and conditioned on (i) the additional text prompt for the update iteration and on (ii) one or more video frames that have already been generated, i.e., one or more video frames that are already in the video as of the update iteration, the additional video segment for the time step.

Depending on how the system receives text prompts, the system can generate variable length videos based on the text prompts in different manners. For example, the system can receive a single text prompt and then use the additional update iterations to extend the length of the generated video while maintaining temporal coherence and relevance to the text prompt. As another example, prior to generating the video, the system can receive respective text prompts for each of multiple scenes in the video. The system can then associate the first text prompt with the first segment and associate each update iteration with a respective one of the received text prompts. The system can then generate a cohesive video that includes the multiple scenes described by the text prompts. As another example, after generating a given segment of the video, the system can play back the segment (or the entire video so far) to a user. The user can then submit a new input specifying a new text prompt that describes the desired content of the next video segment.

The system can then output the generated video, e.g., by storing the video or providing the video for play back on a user device of the user that submitted the text prompt(s).

Particular embodiments of the subject matter described in this specification can be implemented so as to realize one or more of the following advantages.

The described systems can generate long, multi-scene videos from text prompts while maintaining the temporal coherence of the generated videos. Unlike conventional methods for generating video from text descriptions, which are limited to generating short clips of coherent video, the described systems can generate multiple coherent sequences of video from multiple descriptions that remain coherent with one another (i.e., each generated sequence of video makes sense in relation to previously generated sequences of video). By utilizing spatio-temporal encoding of video sequences, the described systems are able to maintain better temporal coherence among video frames both within a single generated video sequence and between multiple generated video sequences. Furthermore, the described systems can compress video into fewer tokens per video compared to other systems which do not use the described techniques. By utilizing spatio-temporal encoding, the described systems are also able learn more efficiently from available training data, including still image data, and can therefore obtain better video generation for a given training effort. The described systems can therefore generate videos of variable length based on the overall stories told by the text descriptions. For example, the system can generate videos of variable length that are descriptive of the text descriptions while keeping the number of video tokens to a minimum so they can be modeled, e.g., by a transformer neural network or other sequence generation neural network, within computational limitations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
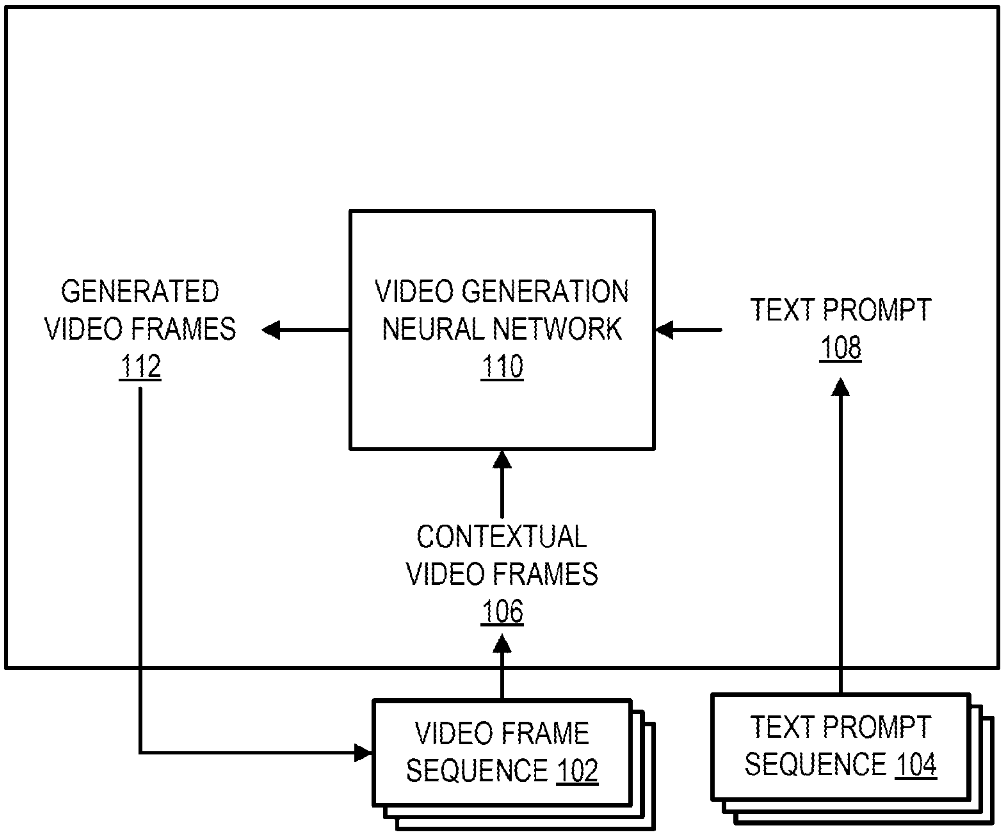
FIG. 1 is a block diagram of an example variable length video generation system.

FIG. 1 shows an example variable length video generation system 100. The variable length video generation system 100 is an example of a system implemented as computer programs on one or more computers in one or more locations in which the systems, components, and techniques described below are implemented.

The variable length video generation system 100 is configured to generate a sequence of video frames 102, elapsing over a sequence of time-steps, based on a received text prompt sequence 104. Generally, the sequence of video frames 102 includes one or more segments of video frames. A segment of video frames is a sequence of video frames shorter than the sequence 102 that elapses over a contiguous sequence of time-steps.

The system 100 generates the video frame sequence 102 by producing a segment of video frames for each received text prompt from the text prompt sequence 104. The system 100 can generate a variable length video frame sequence 102 by, after processing an initial text prompt sequence 104, processing additional text prompts until the generated video frame sequence 102 attains a desired length. Thus, the videos generated by the system 100 can be variable in length, i.e., can include different numbers of video frames.

The system 100 processes the text prompt sequence 104 as context informing the generation of the video frame sequence 102.

Generally, a text prompt is natural language text describing the contents of one or more video frames, e.g., of a scene that is depicted in one or more video frames.

As an example, the text prompt sequence 104 can be multiple repetitions of a single text prompt and the system 100 can generate a video frame sequence 102 depicting a scene described by the single text prompt and that is a cohesive sequence of multiple generated video frame segments.

As another example, the text prompt sequence 104 can include multiple different text prompts and the system 100 can generate a video frame sequence 102 depicting multiple scenes described by the different text prompts and that is a cohesive sequence of multiple generated video frame segments.

The system 100 can receive the text prompt sequence 104 and output the generated video frame sequence 102 by any manner suited to accomplishing a text-to-video generation task. For example, the system 100 can receive the text prompt sequence 104 from memory and can output the generated video frame sequence 102 to memory. As another example, the system 100 can receive the text prompt sequence 104 from a user and can output the generated video frame sequence 102 to memory or can transmit the generated video frame sequence 102 for playback or storage on a user device.

In some implementations, the system 100 can operate interactively with a user to generate the video frame sequence 102.

As an example, the system 100 can iteratively generate the video frame sequence 102 across multiple update iterations based on feedback from the user.

In this example, at the first update iteration, the system 100 can request and receive a first text prompt from the user and generate a first segment of video frames.

In this example, at each subsequent update iteration, the system 100 can display the previously generated video to the user, request an additional text prompt from the user, and generate an additional segment of video frames consistent both with the text prompt received from the user and with the previously generated video within the sequence 102.

In this example, the user can indicate that the system 100 should stop generating video frames and the system 100 can then output the generated video frame sequence 102 to memory or transmit the generated video frame sequence 102 for playback or storage on a user device. In this example, the text prompt sequence 104 will refer to the complete sequence of text prompts received from a user in such an interactive operation.

The system 100 includes a video generation neural network 110 that processes a text prompt 108 and optional contextual video frames 106 to generate video frames 112.

The variable length video generation system 100 iteratively processes text prompts 108 obtained from the text prompt sequence 104 to add corresponding generated video frames 112 to the video frame sequence 102 across multiple update iterations.

At the first update iteration, the system 100 can generate an initial set of video frames 112 using only the text prompt 108 obtained from the text prompt sequence 104 for the first update iteration.

At each update iteration after the first update iteration, the variable length video generation system 100 process contextual video frames 106, which the system 100 obtains from the video frame sequence 102 for that update iteration, alongside the text prompt 108, which the system 100 obtains from the text prompt sequence for that update iteration, to generate video frames 112 for that update iteration. At each update iteration after the first update iteration, the system 100 adds the generated video frames 112 to the video frame sequence 102 for use as contextual video frames 106 in later update iterations. In some implementations, at each update iteration after the first update iteration, the variable length video generation system 100 processes a pre-determined number of contextual video frames 106 that have most recently been added to the video frame sequence 102 as of the update iteration.

The system 100 or another training system can train the video generation neural network 110 to process text prompts 108 to generate video frames 112 using any appropriate methodology for training conditional generative models with training data including pairs of example text prompt sequences 104 and example video frame sequences 102. Such training can be accomplished using any appropriate objective function that measures how well the neural network 110 processes the example text prompt sequences 104 to generate videos mimicking the example video frame sequences 102.

As an example, the neural network 110 can have an architecture appropriate for approaching text-to-video generation as a sequence-to-sequence translation task, such as a bi-directional transformer, and an appropriate objective function can be maximizing the likelihood of generating the example video frame sequences 102 given the text prompt sequences 104. Example architectures of the neural network 110 will be described in more detail below.

Figure 2:
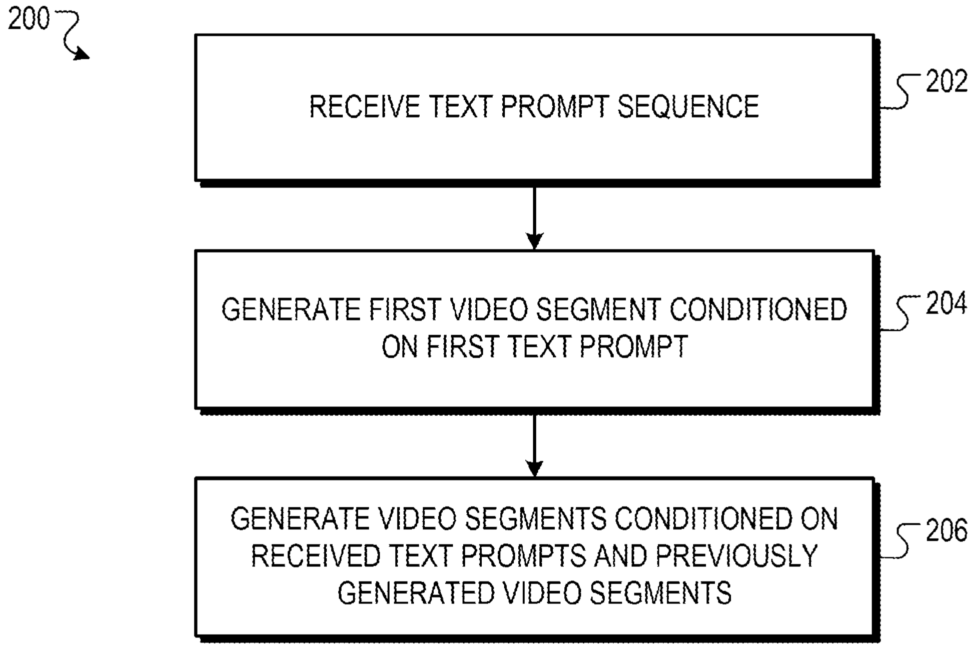
FIG. 2 is a flow diagram of an example process for variable length video generation.

FIG. 2 is a flow diagram of an example process 200 for variable length video generation. For convenience, the process 200 will be described as being performed by a system of one or more computers located in one or more locations. For example, a variable length video generation system, e.g., the variable length video generation system 100 of FIG. 1, appropriately programmed in accordance with this specification, can perform the process 200.

The system receives a first text prompt (step 202).

The system generates, using the video generation neural network and conditioned on the first text prompt, an initial segment of the video (step 204). The initial segment includes a respective video frame at each of a plurality of initial time steps in the video.

The system then generates a respective additional segment at each of one or more update update iterations. In particular, at each update iteration, the system updates the video by generating an additional video segment for the update iteration that includes a respective video frame at each of a plurality of time steps immediately following a last video frame in the video as of the update iteration.

In particular, at any given update iteration, the system can obtain an additional text prompt for the update iteration. For example, the system can receive the additional text prompt from a text prompt sequence in memory. As another example, the system can request and receive a text prompt from a user.

The system then generates, using the video generation neural network and conditioned on the additional text prompt for the update iteration and on one or more video frames in the video as of the update iteration, the additional video segment for the update iteration (step 206).

Generating a segment of the video using the video generation neural network is described in more detail below with reference to FIGS. 3-9.

Thus, the final video generated by the system includes the initial segment of the video followed by the additional video segments generated at the one or more update iterations.

Figure 3:
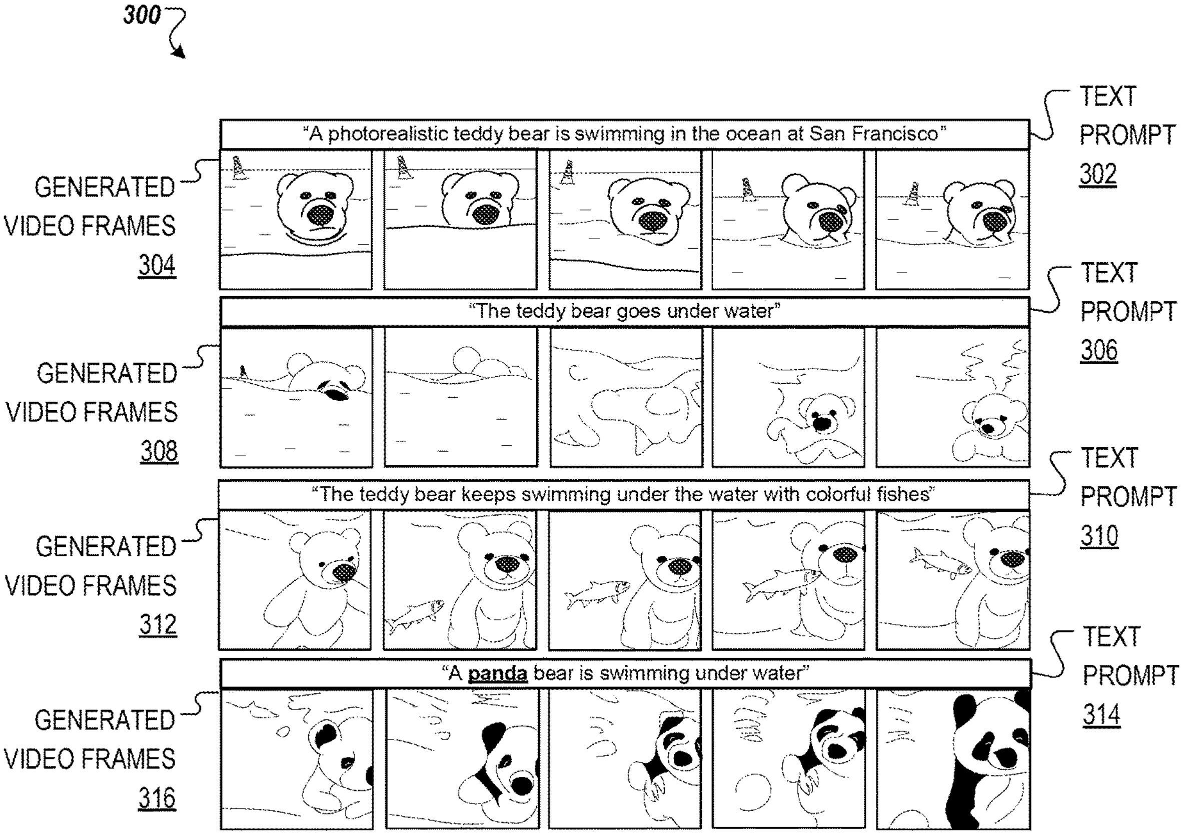
FIG. 3 is an illustration of generating variable length videos based on text prompts.

FIG. 3 shows an illustration of the application of an implementation of the variable length video generation system 100.

In this example, the system 100 receives a text prompt 302 and generates a segment of five video frames 304 conditioned on the received text prompt 302. As an example of interactive video generation based on feedback from a user, the system 100 can request a text prompt from a user, receive the text prompt 302 from the user, and generate the video frames 304 based on the text prompt 302 provided by the user.

The system 100 receives text prompt 306 and generates a next segment of five video frames 308 conditioned on the received text prompt 306 and the previous five video frames 304. Continuing the example of interactive video generation based on feedback from a user, the system 100 can provide the previously generated video frames 304 for the user to view, request a new text prompt from the user, receive the text prompt 306 from the user, and generate the video frames 308 based on the text prompt 306 provided by the user and the previously generated video frames 304.

The system 100 receives text prompt 310 and generates a next segment of five video frames 312 conditioned on the received text prompt 310 and the previous five video frames 308. Continuing the example of interactive video generation based on feedback from a user, the system 100 can provide the previously generated video frames 304 and 308 for the user to view; request a new text prompt from the user, receive the text prompt 310 from the user, and generate the video frames 312 based on the text prompt 310 provided by the user and the previously generated video frames 304 and 308.

The system 100 finally receives text prompt 314 and generates a next segment of five video frames 316 conditioned on the received text prompt 314 and the previous five video frames 312. Continuing the example of interactive video generation based on feedback from a user, the system 100 can provide the previously generated video frames 304, 308, and 312 for the user to view; request a new text prompt from the user, receive the text prompt 314 from the user, and generate the video frames 316 based on the text prompt 314 provided by the user and the previously generated video frames 304, 308, and 312.

Continuing the example of interactive video generation based on feedback from a user, the system 100 provide the previously generated video frames 304, 308, 312, and 316 for the user to view, request a new text prompt from the user, receive an indication from the user that the system 100 should stop generating video frames, and finally output the sequence of generated video frames 304, 308, 312, and 316 to memory or transmit the sequence of generated video frames 304, 308, 312, and 316 for playback or storage on a user device.

For clarity, the collection of text prompts 302, 306, 310, and 314 in this example form a sequence corresponding to the text prompt sequence 104 and individual text prompts from this collection correspond to the text prompt 108. The collection of generated video frame segments 304, 308, 312, and 316 in this example form a sequence corresponding to the video frame sequence 102 and individual video frame segments from this collection correspond to the generated video frames 112. When used to condition the generation of the next segment of video, the video frames 308, 312, and 316 correspond to the contextual video frames 106.

Figure 4:
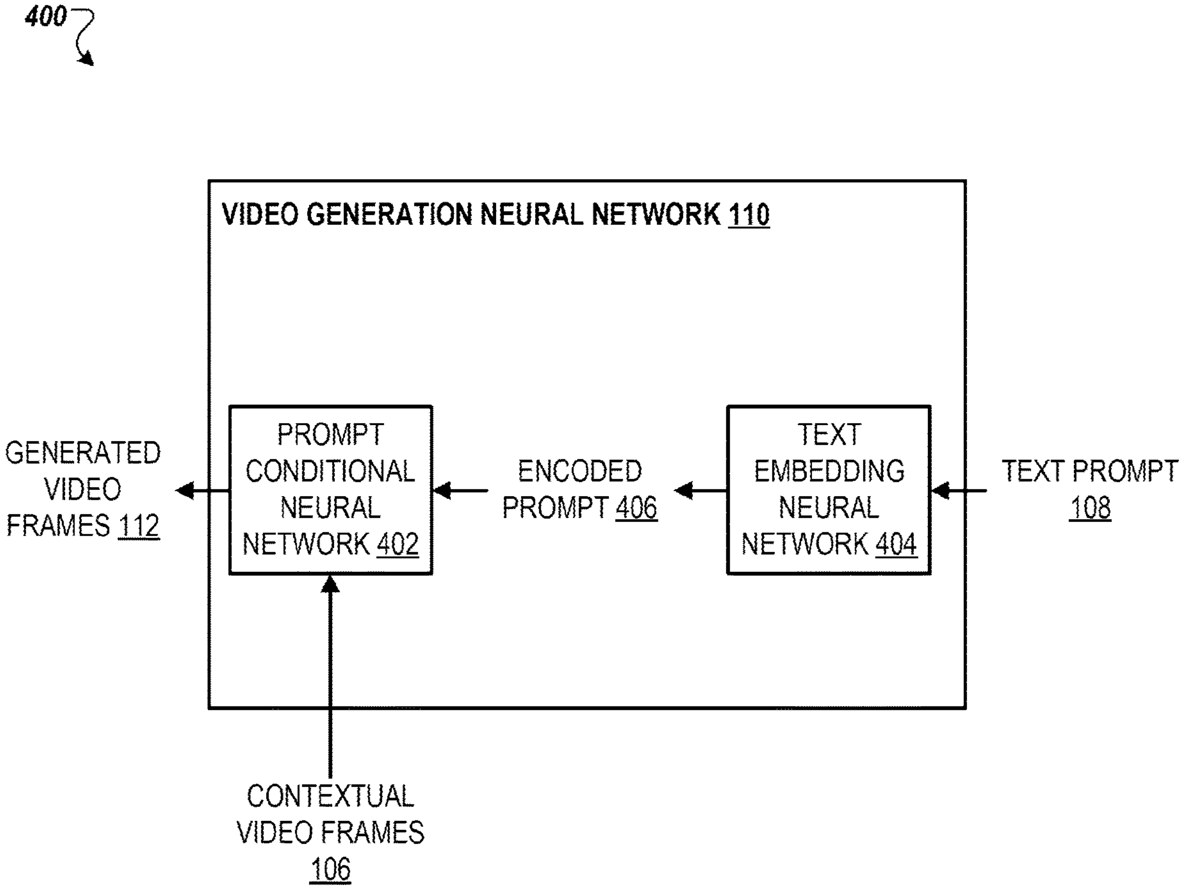
FIG. 4 is a block diagram of an example video generation neural network.

FIG. 4 shows an example video generation neural network 110. The video generation neural network 110 is an example of a system implemented as computer programs on one or more computers in one or more locations in which the systems, components, and techniques described below are implemented.

In some implementations, the video generation neural network 110 can include a text embedding neural network 404 and a prompt conditional neural network 402.

The text embedding neural network 404 can process the text prompt 108 and produce an encoded representation 406 (also referred to as the encoded prompt 406) of the text prompt 108. The text embedding neural network 404 can have any architecture suitable for encoding text into numerical values. For example, the text embedding neural network 404 can be the encoder of a text-to-text transformer, such as BERT or T5, that has been pre-trained to perform a text processing task, such as text prediction or text generation. In some implementations, the pre-trained text embedding neural network 404 is held frozen during the end-to-end training of the overall neural network 110. Holding a first neural network frozen during the training of another neural network means that the parameters of the first neural network 404 are not modified during the training of the other neural network. In some implementations, system 100 fine-tunes the pre-trained text embedding neural network 404 by holding the network 404 frozen during a first portion of the end-to-end training of the overall neural network 110 and then continuing to train the network 404 using the end-to-end training objective during a remaining portion of the end-to-end training of the overall network 110.

The prompt conditional neural network 402 can process encoded prompt 406 and optional contextual video frames 106 and generate video frames 112. The prompt conditional neural network 402 can include multiple component neural networks, which are explained below in reference to FIG. 5.

Figure 5:
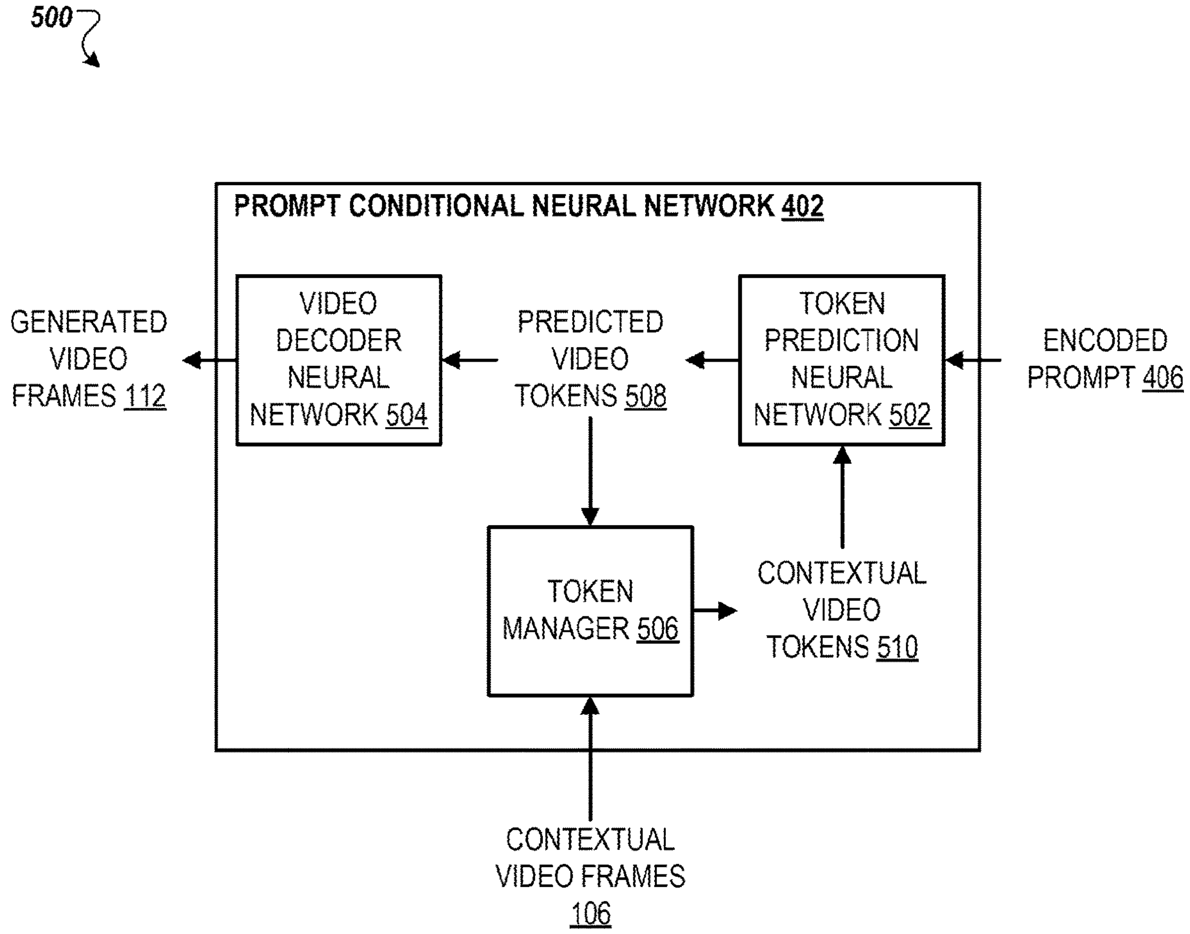
FIG. 5 is a block diagram of an example prompt conditional neural network.

FIG. 5 shows an example prompt conditional neural network 402.

In some implementations, the prompt conditional neural network 402 can include a token prediction neural network 502 and a video decoder neural network 504.

The token prediction neural network 502 can process the encoded prompt 406 and optional contextual video data to generate predicted video tokens 508. As used throughout this specification, a video token is a sequence of numerical values that is part of an encoding of a description of one or more video frames. A sequence of video tokens can describe a segment of video frames.

The video decoder neural network 504 can process the sequence of predicted video tokens 508 to generate the video frames described by the predicted video tokens 508.

The video decoder neural network 504 can generally have any appropriate architecture that allows the video decoder neural network 504 to map a sequence of video tokens to a sequence of video frames. One example of the operations performed by the video decoder neural network is described in more detail below with reference to FIG. 8.

In some implementations, the token prediction neural network 502 can process contextual video tokens 510 as the optional contextual video data and the prompt conditional neural network 402 includes a token manager system 506. The token manager system 506 can receive contextual video frames 106, store a sequence of contextual video tokens, receive and add predicted video tokens 508 to the sequence of contextual video tokens, and output contextual video tokens 510 from the sequence of stored contextual video tokens.

The token prediction neural network 502 can iteratively process the contextual video tokens 510 and the encoded prompt 402 to generate the sequence of predicted video tokens 508 over multiple generative time-steps.

At the first generative time-step of the network 502, the token manager 506 receives the contextual video frames 106, initializes the stored sequence of contextual video tokens, and outputs the first set of contextual video tokens 510 to the token prediction neural network 502. The token prediction neural network processes the first set of contextual video tokens 510 and the encoded prompt 402 to generate the first set of predicted video tokens 508. The token manager 506 adds the first set of predicted video tokens 508 to the set of stored contextual video tokens.

At each subsequent generative time-step of the network 502, the token manager 506 outputs the set of contextual video tokens 510 for the generative time-step to the token prediction neural network 502. The token prediction neural network processes the set of contextual video tokens 510 for each subsequent generative time-step and the encoded prompt 402 to generate the set of predicted video tokens 508 for the generative time-step. The token manager 506 adds the set of predicted video tokens 508 for each subsequent generative time-step to the set of stored contextual video tokens.

At the first generative time-step of the network 502, during the first update iteration of the system 100 when generating the initial video frames, the system 100 might not receive contextual video frames 106. The token manager 506 and the token prediction neural network 502 can be configured to operate appropriately when the system 100 does not receive contextual video frames 106. For example, the token manager 506 can be configured to output the first set of contextual tokens 510 having predefined null values if the token manager 506 does not receive contextual video frames 506. As another example, the network 506 can be configured to process a variable number, possibly zero, of contextual tokens 510 and the token manager 506 can omit outputting a first set of contextual tokens 510 during the first update iteration of the system 100.

In some implementations, the token prediction neural network can process the received contextual video frames 106 as the optional contextual video data.

The token prediction neural network 502 can have any architecture suited for text-conditioned token prediction.

For example, the token prediction neural network 502 can be a bi-directional transformer model that processes an input sequence including the sequence of contextual video tokens 510 and the encoded prompt 402 to generate the sequence of predicted video tokens 508. As another example, the token prediction neural network 502 can be a conditional bi-directional transformer model that processes, conditioned on the encoded prompt 402, the input sequence of contextual video tokens 510 to generate the sequence of predicted video tokens 508.

Generally, the token prediction neural network 502 is trained during the training of the overall neural network 110.

Figure 6:
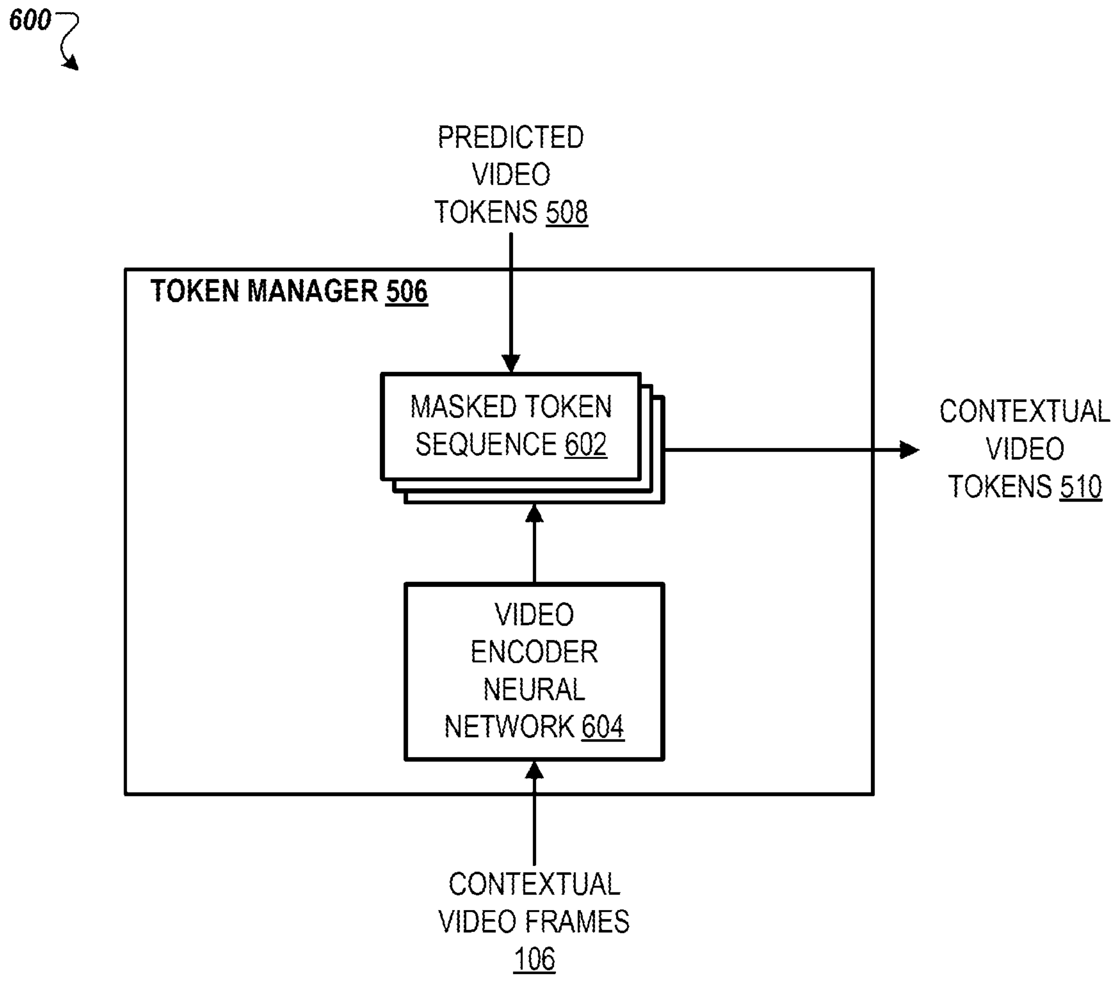
FIG. 6 is a block diagram of an example token manager system.

FIG. 6 shows an example token manager system 506. The token manager system 506 is an example of a system implemented as computer programs on one or more computers in one or more locations in which the systems, components, and techniques described below are implemented.

In some implementations, the token manager system 506 can store a sequence of masked video tokens 602 as the sequence of stored contextual video tokens. A masked video token can be a video token with numerical values set to a pre-determined value denoting that the token is masked or a video token with arbitrary numerical values alongside an additional numerical flag indicating that the token is masked.

The masked token sequence 602 has an autoregressive order with which the sequence 602 encodes a corresponding video frame sequence. In some implementations, the token manager system 506 stores the masked token sequence 602 following the autoregressive order. In some implementations, the token manager system can also store and process additional numerical values included alongside or within the masked token sequence 602 that describe the autoregressive order.

The masked token sequence 602 can include unmasked video tokens, which have the same format as the described masked tokens but lack the appropriate indication that the token is considered masked. In implementations where the token manager system 506 stores a sequence of masked tokens, the token manager can, for each generative time-step of the token prediction neural network 502, provide a subset of tokens from the sequence 602 to be processed by the network 502 as contextual video tokens 510. At each generative time-step of the token prediction neural network 502, the token manager system can add predicted video tokens 508 produced by the network 502 to the stored sequence of contextual video tokens by storing the predicted video tokens 508 as unmasked video tokens within the sequence 602. When the token manager 506 stores masked video tokens and unmasked contextual video tokens within the sequence 602, it is referred to as storing a combined sequence of the masked tokens and the contextual video tokens.

For the first generative time-step of the network 502, the token manager system 506 can initialize the token sequence 602 to be a sequence composed entirely of masked tokens. If the token manager system 506 receives the contextual video frames 106 for the first generative time-step of the network 502, the token manager can store unmasked video tokens that encode the contextual video frames 106 into the stored sequence 602 and can output the first set of contextual video tokens 510, including some or all of the unmasked video tokens encoding the contextual video frames 106, to the token prediction neural network 502. The token manager 506 can add the first set of predicted video tokens 508 to the sequence 602 by replacing masked tokens within the sequence 602 with the first set of unmasked predicted video tokens 508. For each subsequent generative time-step of the network 502, the token manager 506 can output the set of contextual video tokens 510 for the generative time-step, including some or all of the unmasked tokens stored within the sequence 602, to the token prediction neural network 502. The token manager 506 can adds the set of predicted video tokens 508 for each subsequent generative time-step to the sequence 602 by replacing masked tokens within the sequence 602 with the set of unmasked predicted video tokens 508 for the generative time-step.

When the neural network 110 includes a token manager that stores masked tokens within the token sequence 602 and replaces those masked tokens with predicted video tokens 508, the loss function for training the overall network 110 can be any objective function suited for measuring how well the token prediction neural network 502 processes text embeddings of example text prompts to predict video token sequences corresponding to example video frame sequences. For example, the loss function for training the network 110 can be:

$$L = -\sum_{i \in M} \log p(a_i \mid a_{U_i}, t)$$

Where $\mathcal{M}$ is the set of indices of all masked tokens and $p(a_i|a_{U_i}, t)$ is the probability assigned by the token prediction neural network 502 to the ground truth example for a masked token, $a_i$, given the set of all previously unmasked tokens, $a_{U_i}$, and the text embedding t of the ground truth example text prompt.

In some implementations, the token manager system 506 can include a video encoder network 604. The video encoder network 604 can process contextual video frames 106 and produce corresponding video tokens. The token manager system 506 can add the output tokens from the video encoder neural network as unmasked tokens within the masked token sequence 602.

In some implementations, the video encoder neural network 604 can perform spatio-temporal encoding of video frames and the video decoder neural network 504 performs spatio-temporal decoding of video tokens.

A spatio-temporal encoding of a segment of video frames includes one or more spatial video tokens whose combined numerical values represent an initial frame of the video segment. The segment of video frames is described by numerical values (e.g., RGB values) assigned to spatial regions (e.g. individual pixels or groups of pixels) of the video frames. The spatio-temporal encoding further includes, for each particular region of the video frames, a number of spatio-temporal tokens that characterize how the region changes over time during the duration of the segment of video frames.

To perform spatio-temporal decoding, the video decoder neural network 506 processes a sequence of spatio-temporal encoded video tokens and producing an appropriately corresponding sequence of video frames.

Figure 7:
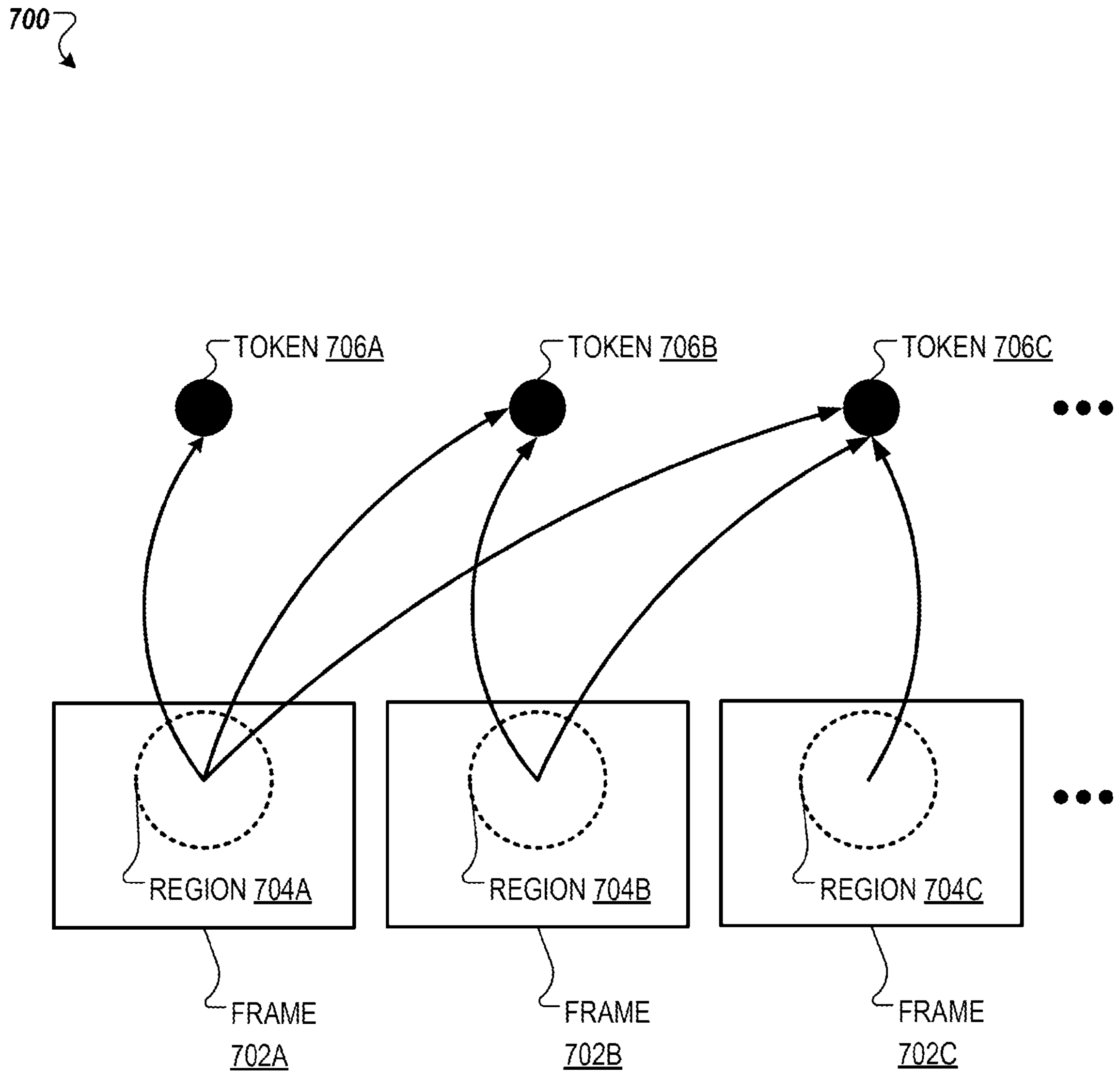
FIG. 7 is an illustration of encoding video frames to spatio-temporal tokens.

FIG. 7 shows an illustration of how spatio-temporal video tokens encode information from video frame data. This illustration generally depicts how information represented by a sequence of video tokens relates to information represented within a sequence of video frames and may not depict the exact mechanism by which a sequence of spatio-temporal video tokens is created from a sequence of video frames.

A sequence of spatio-temporal video tokens 706A, 706B, 706C and so on are produced by processing a sequence of video frames 702A. 702B, 702C and so on. Each spatio-temporal token encodes information regarding a specific region of a specific video frame, which will be referred to as the current frame of the token. For example, token 706A encodes information regarding region 704A within video frame 702A and video frame 702A is considered the current frame of token 704A. Within a sequence of video tokens that encode the entirety of a sequence of video frames, multiple sub-sequences of video tokens may be required wherein tokens of the same sub-sequence encode information regarding a shared region of the frames of the video sequence and wherein tokens of the different sub-sequence encode information regarding distinct regions of the frames of the video sequence. Tokens 706A, 706B. 706C, and so on form such a sub-sequence, with regions 704A, 704B, 706C, and so on being the same region of different video frames. The sequence of video frames follows an ordering, typically though not necessarily the relative time at which each frame was captured, such that each particular video frame in the sequence may be described as having a history, which is the set of all video frames including the particular video frame and all video frames appearing earlier within the ordering of the video frame sequence. For example, frame 702A has a history that includes only frame 702A, frame 702B has a history that includes frames 702B and 702A, and frame 702C has a history that includes frames 702C, 702B, and 702A. The process of encoding video frame information into a particular token involves encoding video data from the same region of the frames within the history of the current frame of the particular token. For example, token 706A encodes video data of region 704A, token 706B encodes video data of regions 704A and 704B, and token 706C encodes video data of regions 704A, 704B, and 704C. In this described sense, the spatio-temporal video tokens autoregressively depend on the sequence of video frames. During encoding, the spatio-temporal video sequence is provided an ordering, referred to here as the token ordering, that depends on at least the ordering of the current frames of the video tokens and on optional additional information, which may include a spatial ordering of the regions within the encoded video frames. The token ordering may be explicitly represented as numerical values included within or provided alongside the video token sequence or may be implicitly represented by the sequential ordering of the video tokens in memory. A sequence of spatio-temporal video tokens need not exhaustively or losslessly encode a sequence of video frames to be considered an encoding of a sequence of video frames. Therefore, from a particular sequence of spatio-temporal video tokens encoding a particular sequence of video frames, subsets of the sequence of spatio-temporal video tokens may be considered to form sub-sequences of video tokens that also encode the same particular sequence of video frames.

Figure 8:
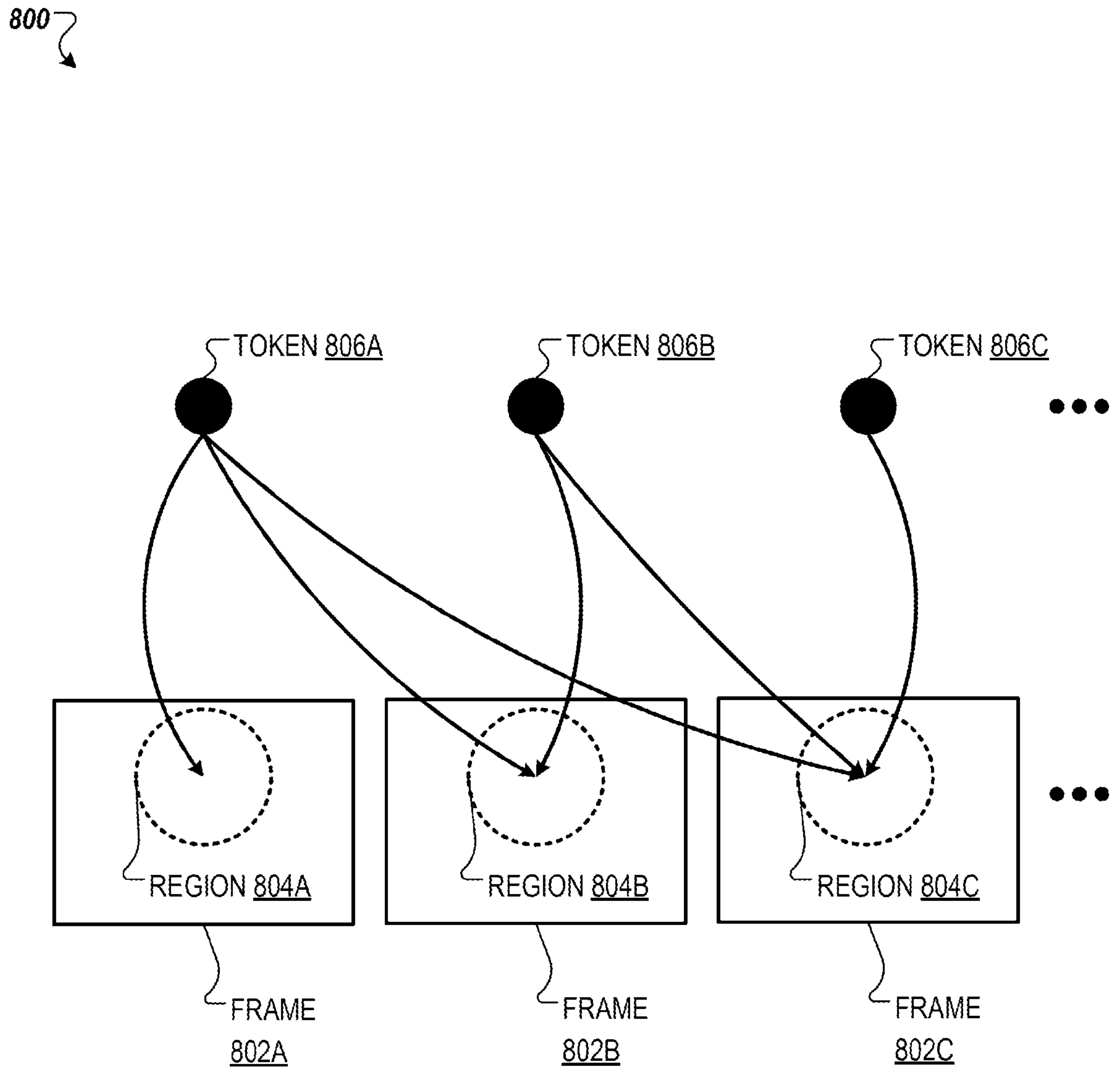
FIG. 8 is an illustration of decoding spatio-temporal tokens to video frames.

FIG. 8 shows an illustration of how spatio-temporal video tokens may be decoded to produce a sequence of video frames. This illustration generally depicts how information represented by a sequence of video tokens relates to information represented within a sequence of video frames and may not depict the exact mechanism by which a sequence of video frames is created from a sequence of spatio-temporal video tokens.

A sequence of video frames 802A, 802B, 802C and so on are decoded from a sequence of spatio-temporal video tokens 806A, 806B, 806C and so on. Information regarding specific regions within the decoded video frame is encoded within particular video tokens. For example, information regarding region 804C is encoded within video tokens 806A, 806B, and 806C. For each decoded region within a video frame, there is one particular video token, referred to here as the current token for the region, within the sequence of spatio-temporal video tokens that may be considered a latest token for the region. Each decoded region within a video frame may be described as having a token history, which is a set of all spatio-temporal video tokens that includes the current token for the region and all video tokens appearing earlier within the token ordering of the spatio-temporal video token sequence. For example, region 804A has a token history that includes only token 806A, region 804B has a token history that includes tokens 806B and 806A, and region 804C has a token history that includes tokens 806C, 806B, and 806A. The process of decoding a particular region of video frame data involves involves decoding video data encoded within the video tokens within the token history of the that particular region. For example, region 804A is determined by processing information encoded within token 806A, region 804B is determined by processing information encoded within tokens 806B and 806A, and region 804C is determined by processing information encoded within tokens 806C, 806B, and 806A. In this described sense, the video frames are auto-regressively decoded from the sequence of spatio-temporal video tokens.

Figure 9:
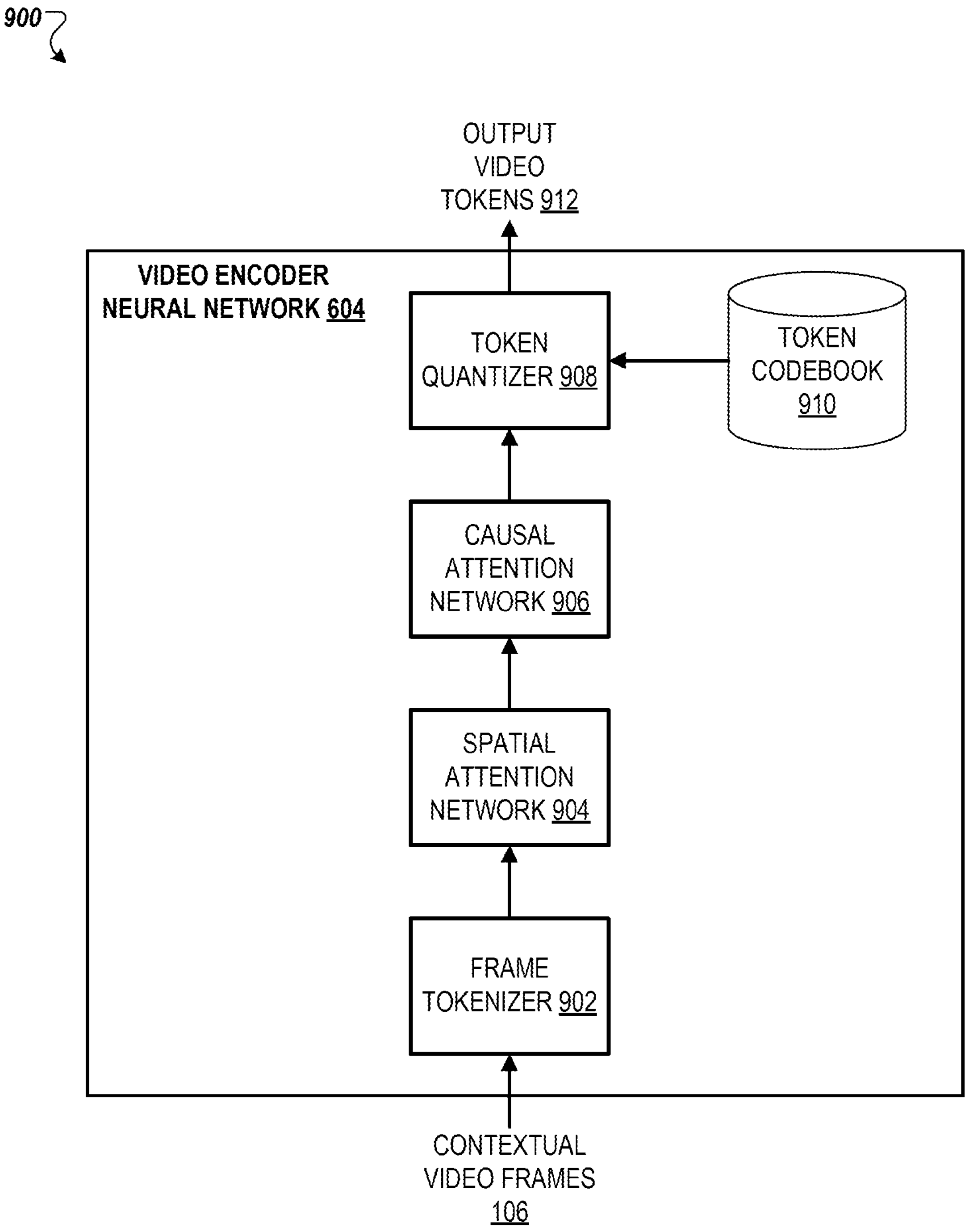
FIG. 9 is a block diagram of an example video encoder neural network.

FIG. 9 shows an example video encoder neural network 604. The video encoder neural network 604 is an example of a system implemented as computer programs on one or more computers in one or more locations in which the systems, components, and techniques described below are implemented.

In implementations where the video encoder neural network 604 is configured to perform spatio-temporal encoding of video frames, the video encoder neural network 604 can include a frame tokenizer network 902, a spatial attention network 904, and a causal attention network 906 and can store a token codebook 910.

The frame tokenizer network 902 can process contextual video frames 106 to generate a sequence of initial video tokens. The frame tokenizer can have any architecture suitable for image-to-sequence translation. For example, the frame tokenizer network 902 can be the encoder of a Vision Transformer network.

The spatial attention network 904 can process a sequence of video tokens to generate a corresponding sequence of updated spatially attended video tokens. The spatial attention network 904 can have any architecture suitable for sequence-to-sequence translation. For example, the spatial attention network 904 can be a transformer architecture implementing all-to-all attention. As a further example, the spatial attention network 904 can be a transformer architecture implementing all-to-all attention among tokens corresponding to the same video frame.

The causal attention network 906 can process a sequence of video tokens to generate a corresponding sequence of updated causally attended video tokens. The causal attention network 906 can have any architecture suitable for sequence-to-sequence translation. For example, the causal attention network 906 can be a transformer architecture implementing all-to-all attention. As a further example, the causal attention network 906 can be a transformer architecture implementing all-to-all attention among tokens corresponding to the same spatial region.

The token quantizer 908 can process a sequence of video tokens to generate a corresponding sequence of quantized video tokens, where each quantized video token is a code word whose value is stored or represented within the token codebook 910. The token quantizer 908 can have any architecture suited to performing vector quantization, such as in the Vector Quantized VAE (VQ-VAE) or in the Vector Quantized GAN (VQ-GAN).

The video encoder neural network 604 first processes the input contextual video frames 106 using the frame tokenizer network 902 to produce a sequence of initial video tokens. The video encoder neural network 604 processes the sequence of initial video tokens using the spatial attention network 904 to produce a sequence of spatially attended tokens. The video encoder neural network 604 processes the sequence of initial video tokens using the causal attention network 906 to produce a sequence of causally attended video tokens. The video encoder neural network 604 finally processes the sequence of causally attended video tokens using the token quantizer 908 produce the output sequence of quantized video tokens 912. The video encoder neural network 604 can encode still images by not processing the spatially attended token sequence using the causal attention network 906 and instead processing the spatially attended token sequence using the token quantizer 908 to produce the output sequence of quantized tokens.

In implementations where the video decoder neural network 504 is configured to perform spatio-temporal decoding of video frames, the video decoder neural network 504 can include a decoder causal attention network, a decoder spatial attention network, and a token decoder network.

The decoder causal attention network can process a sequence of spatio-temporally encoded video tokens to generate a corresponding sequence of updated causally attended video tokens. The decoder causal attention network can have any architecture suitable for sequence-to-sequence translation. For example, the decoder causal attention network can be a transformer architecture implementing all-to-all attention. As a further example, the decoder causal attention network can be a transformer architecture implementing all-to-all attention among tokens corresponding to the same spatial region.

The decoder spatial attention network can process a sequence of causally attended video tokens to generate a corresponding sequence of updated spatially attended video tokens. The decoder spatial attention network can have any architecture suitable for sequence-to-sequence translation. For example, the decoder spatial attention network can be a transformer architecture implementing all-to-all attention. As a further example, the decoder spatial attention network can be a transformer architecture implementing all-to-all attention among tokens corresponding to the same video frame.

The token decoder network can process a sequence of spatially attended video tokens to produce a segment of video frames 112. The token decoder network can have any architecture suitable for sequence-to-video translation. For example, the token decoder network can be a linear projection network.

The video decoder neural network 504 first processes the input spatio-temporally encoded predicted video tokens 508 using the decoder causal attention network to produce a sequence of causally attended video tokens. The video decoder neural network 504 processes the sequence of causally attended video tokens using the decoder spatial attention network to produce a sequence of spatially attended tokens. The video decoder neural network 504 finally processes the sequence of spatially attended video tokens using the token decoder network to produce the output segment of video frames 112. The video decoder neural network 504 can decode tokens that still images by not processing the input token sequence using the decoder causal attention network and instead processing the input token sequence using the decoder spatial attention network to produce the sequence of spatially attended tokens.

The video decoder neural network 504 and the video encoder neural network 604 can be jointly pre-trained using any appropriate methodology to perform image or video processing tasks. For example, the networks 504 and 604 can be jointly pre-trained to perform video reconstruction using a training set composed of example video sequences and using one or more objective functions appropriate for measuring video reconstruction performance. As another example, the networks 504 and 604 can be jointly pre-trained to perform image reconstruction using a training set composed of example image sequences and using one or more objective functions appropriate for measuring image reconstruction performance. In some implementations, the decoder network 504 and the encoder network 604 can be held frozen during the end-to-end training of the overall network 110. In some implementations, system can 100 fine-tune the decoder network 504 and the encoder network 604 by holding the networks 504 and 604 frozen during a first portion of the end-to-end training of the overall neural network 110 and then continuing to train the networks 504 and 604 using the end-to-end training objective during a remaining portion of the end-to-end training of the overall network 110.

Appropriate objective functions for image and video reconstruction can include distortion losses, such as root-mean-squared-distance (or L2 distance), that measure a pixel-wise error between generated and example video frames. Appropriate objective functions image and video reconstruction can include divergences or perceptual losses, such as the Frechet Inception Distance, Inception Score, Image Perceptual losses, and Video Perceptual losses, that measure how convincingly the generated video frames match the distribution of example video frames. In some implementations, a neural network called a discriminator can be trained alongside the decoder network 504 and the encoder network 604 to classify reconstructions as either being from the distribution of reconstructions or from the distribution of example data. In implementations where a discriminator is trained alongside the networks 504 and 604, appropriate objective functions can include an adversarial loss that measures how accurately the discriminator is able to classify the reconstructed data. In implementations where the encoder network 604 employs vector quantization, appropriate objective functions can include a vector quantization loss, such as the example loss used by the VQ-VAE and VQ-GAN:

$$L_{VQ} = \|sg(z) - e\|^2 + \beta\|z - sg(e)\|^2$$

Where z is the token to be quantized, e is the vector quantization of the token, β is a pre-determined commitment loss weight, and sg is a stop-gradient function that returns its input operand as a constant for the purpose of differentiation for back-propagation.

With $L_{VQ}$ denoting a vector quantization loss, $L_2$ denoting an L2 distance, $L_{IP}$ denoting an Image Perceptual loss. $L_{VP}$ denoting a Video Perceptual loss, and $L_{Adv}$ denoting an adversarial loss, an example appropriate objective function for jointly pre-training the decoder network 504 and the encoder network 604 is as follows:

$$L = L_{VQ} + 0.1L_{IP} + 0.1L_{Adv} + L_{VP} + L_2$$

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few:

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback. e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production. i.e., inference, workloads.

Machine learning models can be implemented and deployed using a machine learning framework. e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication. e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device. e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for generating a video comprising a respective video frame at each of a sequence of time steps, the method comprising:

receiving a first text prompt;

generating, using a video generation neural network and conditioned on the first text prompt, an initial segment of the video that comprises a respective video frame at each of a plurality of initial time steps in the video, wherein the video generation neural network comprises a token prediction neural network and a video decoder neural network, the generating comprising:

processing the first text prompt using a text embedding neural network to generate an encoded representation of the first text prompt;

generating, using the token prediction neural network, a sequence of video tokens that represent the initial segment conditioned on the encoded representation of the first text prompt; and processing the sequence of video tokens using the video decoder neural network to generate the video frames in the initial segment; and for each of one or more update iterations, updating the video by generating an additional video segment for the update iteration that includes a respective video frame at each of a plurality of time steps immediately following a last video frame in the video as of the update iteration, the updating comprising:

obtaining an additional text prompt for the update iteration; and generating, using the video generation neural network and conditioned on the additional text prompt for the update iteration and on one or more video frames in the video as of the update iteration, the additional video segment for the update iteration.

2. The method of claim 1, wherein the token prediction neural network is configured to:

receive an input sequence of video tokens, wherein one or more of the video tokens in the input sequence are masked tokens, and process the input sequence of video tokens conditioned on an encoded representation of a text prompt to generate respective predicted tokens for each of the one or more masked tokens.

3. The method of claim 2, wherein generating, using the token prediction neural network, a sequence of video tokens that represent the initial segment conditioned on the encoded representation of the first text prompt comprises:

initializing the sequence of video tokens as a sequence that includes only masked tokens and, at each of a plurality of generation time steps:

processing the sequence of video tokens conditioned on the encoded representation of the text prompt to generate a respective predicted token for each of the masked tokens in the sequence; and updating the sequence by replacing one or more of the masked tokens with the respective predicted token for the masked token.

4. The method of claim 2, wherein generating, using the video generation neural network and conditioned on the additional text prompt for the update iteration and on one or more video frames in the video as of the update iteration, the additional video segment for the time step comprises:

processing the additional text prompt using the text embedding neural network to generate an encoded representation of the additional text prompt; and generating the additional segment of the video using the video generation neural network while the video generation neural network is conditioned on the encoded representation of the additional text prompt and on one or more video frames in the video as of the update iteration.

5. The method of claim 4, wherein the video generation neural network further comprises a video encoder neural network and wherein generating the additional segment of the video using the video generation neural network while the video generation neural network is conditioned on the encoded representation of the additional text prompt and on one or more video frames in the video as of the update iteration comprises:

processing the K last video frames in the video as of the update iteration using the video encoder neural network to generate a context sequence of video tokens that represents the K last video frames;

generating, using the token prediction neural network, an additional sequence of video tokens that represent the additional segment conditioned on the encoded representation of the additional text prompt and the context sequence of video tokens; and processing at least the additional sequence of video tokens using the video decoder neural network to generate the video frames in the additional segment.

6. The method of claim 5, wherein generating, using the token prediction neural network, an additional sequence of video tokens that represent the additional segment conditioned on the encoded representation of the additional text prompt and the context sequence of video tokens comprises:

initializing a combined sequence of video tokens as a sequence that includes the context sequence of video tokens and a respective masked token for each video token in the additional sequence and, at each of a plurality of generation time steps:

processing the combined sequence of video tokens using the token prediction neural network conditioned on the encoded representation of the additional text prompt to generate a respective predicted token for each of the masked tokens in the combined sequence; and updating the combined sequence by replacing one or more of the masked tokens with the respective predicted token for the masked token.

7. The method of claim 5, wherein the video encoder neural network is configured receive an input video segment and to process the input video segment to generate an output sequence of video tokens that represent the video segment and that include:

one or more spatial tokens that represent a first frame in the video segment independently of the other frames in the input video segment; and a plurality of spatio-temporal tokens that each represent a corresponding spatial region in a corresponding set of multiple video frames and that auto-regressively depend on previous frames from the input video segment relative to the corresponding set of multiple video frames.

8. The method of claim 7, wherein the encoder neural network is configured to:

generate a sequence of initial video tokens from the input video segment;

process the sequence of initial video tokens from the input video segment using one or more Transformer layers that apply all-to-all attention along the spatial dimensions to generate a sequence of updated video tokens;

process the sequence of updated video tokens using one or more Transformer layers that apply causal attention along the temporal dimension to generate an initial output sequence of video tokens; and apply quantization to the initial output sequence of video tokens using a learned codebook to generate the output sequence of video tokens.

9. The method of claim 7, wherein the token prediction neural network is trained to perform text-conditioned token prediction on sequences of video tokens generated by the video encoder neural network after the video encoder neural network has been trained.

10. The method of claim 9, wherein the token prediction neural network is trained on training examples that include:

(i) video training examples that each include a video segment and a corresponding text prompt, and (ii) image training examples that each include only a single image and a corresponding text prompt.

11. The method of claim 1, wherein the token prediction neural network is a bi-directional Transformer.

12. The method of claim 1, wherein the first text prompt and each additional text prompt are the same text prompt.

13. The method of claim 1, wherein the first text prompt and the one or more additional text prompts include at least two text prompts that are different from one another.

14. The method of claim 1, further comprising:

receiving an input image; and wherein generating, using a video generation neural network and conditioned on the first text prompt, an initial segment of the video that comprises a respective video frame at each of a plurality of initial time steps in the video comprises:

generating, using the video generation neural network and conditioned on the first text prompt, the initial segment of the video while constraining the first image at the first time step in the video to be the input image.

15. A system comprising one or more computers and one or more storage devices storing instructions that are operable, when executed by the one or more computers, to cause the one or more computers to perform operations comprising:

receiving a first text prompt;

generating, using a video generation neural network and conditioned on the first text prompt, an initial segment of the video that comprises a respective video frame at each of a plurality of initial time steps in the video, wherein the video generation neural network comprises a token prediction neural network and a video decoder neural network, the generating comprising:

processing the first text prompt using a text embedding neural network to generate an encoded representation of the first text prompt;

generating, using the token prediction neural network, a sequence of video tokens that represent the initial segment conditioned on the encoded representation of the first text prompt; and processing the sequence of video tokens using the video decoder neural network to generate the video frames in the initial segment; and for each of one or more update iterations, updating the video by generating an additional video segment for the update iteration that includes a respective video frame at each of a plurality of time steps immediately following a last video frame in the video as of the update iteration, the updating comprising:

obtaining an additional text prompt for the update iteration; and generating, using the video generation neural network and conditioned on the additional text prompt for the update iteration and on one or more video frames in the video as of the update iteration, the additional video segment for the update iteration.

16. The system of claim 15, wherein the token prediction neural network is configured to:

receive an input sequence of video tokens, wherein one or more of the video tokens in the input sequence are masked tokens, and process the input sequence of video tokens conditioned on an encoded representation of a text prompt to generate respective predicted tokens for each of the one or more masked tokens.

17. The system of claim 16, wherein generating, using the token prediction neural network, a sequence of video tokens that represent the initial segment conditioned on the encoded representation of the first text prompt comprises:

initializing the sequence of video tokens as a sequence that includes only masked tokens and, at each of a plurality of generation time steps:

processing the sequence of video tokens conditioned on the encoded representation of the text prompt to generate a respective predicted token for each of the masked tokens in the sequence; and updating the sequence by replacing one or more of the masked tokens with the respective predicted token for the masked token.

18. The system of claim 16, wherein generating, using the video generation neural network and conditioned on the additional text prompt for the update iteration and on one or more video frames in the video as of the update iteration, the additional video segment for the time step comprises:

processing the additional text prompt using the text embedding neural network to generate an encoded representation of the additional text prompt; and generating the additional segment of the video using the video generation neural network while the video generation neural network is conditioned on the encoded representation of the additional text prompt and on one or more video frames in the video as of the update iteration.

19. The system of claim 18, wherein the video generation neural network further comprises a video encoder neural network and wherein generating the additional segment of the video using the video generation neural network while the video generation neural network is conditioned on the encoded representation of the additional text prompt and on one or more video frames in the video as of the update iteration comprises:

processing the K last video frames in the video as of the update iteration using the video encoder neural network to generate a context sequence of video tokens that represents the K last video frames;

generating, using the token prediction neural network, an additional sequence of video tokens that represent the additional segment conditioned on the encoded representation of the additional text prompt and the context sequence of video tokens; and processing at least the additional sequence of video tokens using the video decoder neural network to generate the video frames in the additional segment.

20. One or more non-transitory computer-readable storage media encoded with instructions that, when executed by one or more computers, cause the one or more computers to perform operations comprising:

receiving a first text prompt;

generating, using a video generation neural network and conditioned on the first text prompt, an initial segment of the video that comprises a respective video frame at each of a plurality of initial time steps in the video, wherein the video generation neural network comprises a token prediction neural network and a video decoder neural network, the generating comprising:

processing the first text prompt using a text embedding neural network to generate an encoded representation of the first text prompt;

generating, using the token prediction neural network, a sequence of video tokens that represent the initial segment conditioned on the encoded representation of the first text prompt; and processing the sequence of video tokens using the video decoder neural network to generate the video frames in the initial segment; and for each of one or more update iterations, updating the video by generating an additional video segment for the update iteration that includes a respective video frame at each of a plurality of time steps immediately following a last video frame in the video as of the update iteration, the updating comprising:

obtaining an additional text prompt for the update iteration; and generating, using the video generation neural network and conditioned on the additional text prompt for the update iteration and on one or more video frames in the video as of the update iteration, the additional video segment for the update iteration.

* * * * *